March 7, 1933.  R. R. SHIRLEY  1,900,306
DAIRY PRODUCTS REFRIGERATOR
Filed July 16, 1928
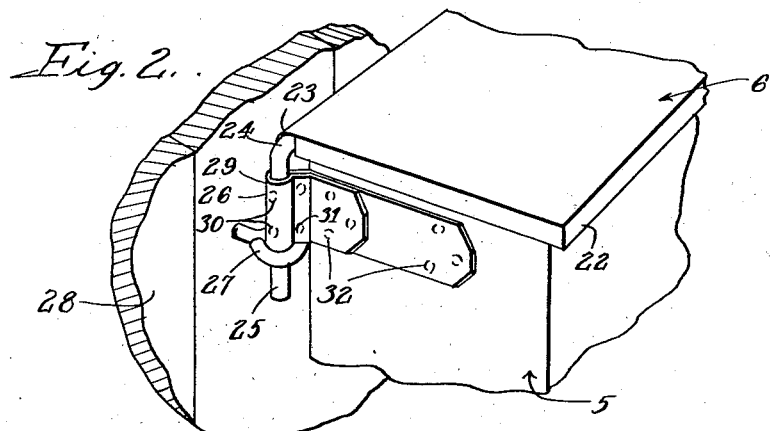
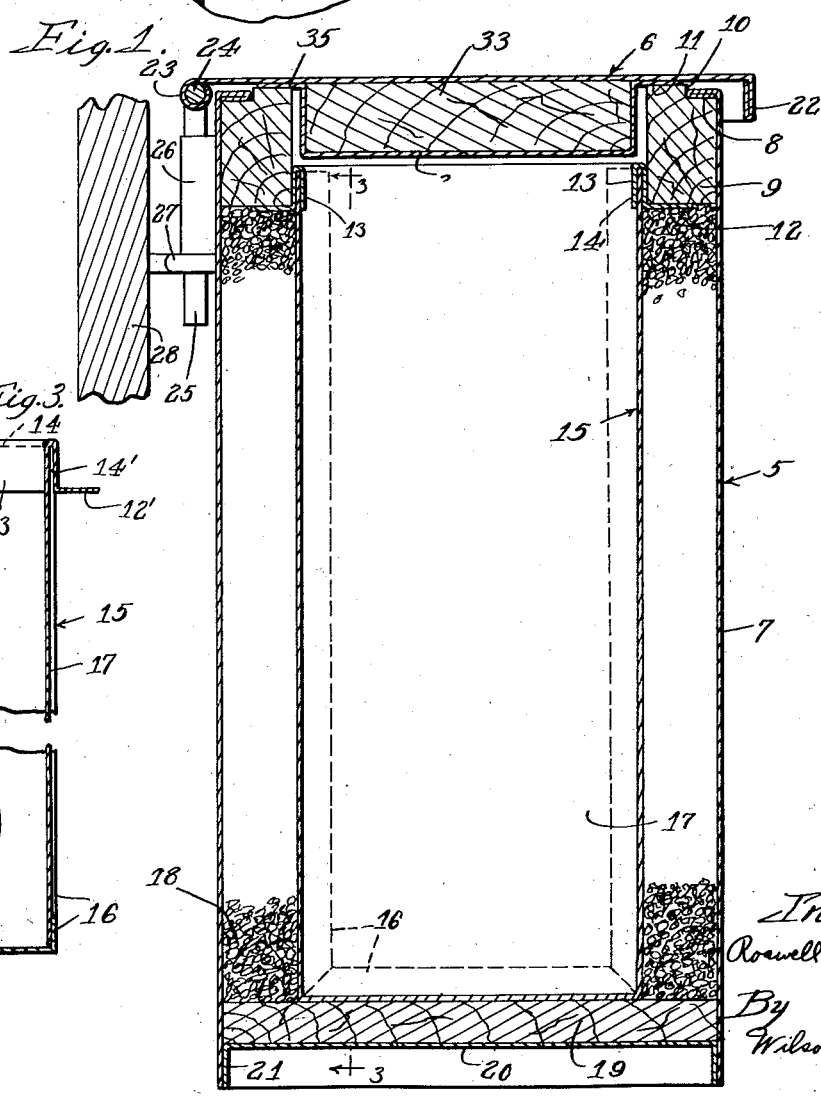

Patented Mar. 7, 1933

1,900,306

UNITED STATES PATENT OFFICE

ROSWELL R. SHIRLEY, OF ROCKFORD, ILLINOIS

DAIRY PRODUCTS REFRIGERATOR

Application filed July 16, 1928. Serial No. 293,178.

This invention relates to a refrigerator or ice box for domestic use in the storing of dairy products, such as butter and milk, which are customarily delivered early in the morning and when left on the doorstep are apt to spoil or be tampered with by roving animals.

According to the present invention the refrigerator, mounted on the wall out of reach of animals, is provided with a lid arranged to be raised by the milkman to place the bottles or cartons therein and, at the same time, a small chunk of ice sufficient to keep the products in good sanitary condition at least until they are removed by the householder, the refrigerator being thoroughly insulated such that it not only serves to keep the dairy products from spoiling in warm weather but also keeps the same from freezing in cold weather.

The device of the present invention embodies various novel features of construction and arrangement designed with a view to sturdiness and serviceability, ease and simplicity in assembling, as well as economy of manufacture, and facility in the mounting of the device on the wall in a quickly detachable fashion so that the same may be easily taken down and emptied and cleaned out whenever desired.

Referring to the accompanying drawing—

Figure 1 is a vertical cross-section through a refrigerator made in accordance with my invention;

Fig. 2 is a fragmentary detail in perspective showing the way in which the device is arranged to be mounted on the wall for easy removal and replacement; and Fig. 3 is a section through one side of the inner container taken on the line 3—3 of Fig. 1, showing the novel construction employed.

The same reference numerals are applied to corresponding parts throughout the views.

The device comprises a box 5 suitably of rectangular form and large enough to accommodate several quart bottles of milk and cartons of butter, together with some ice to keep the same in good condition for as long a time as these products may be stored therein until the householder removes the same. The box has a lid 6 arranged to be raised to afford access to the contents but which normally seals the box such that its refrigerating efficiency, as will presently appear, is fairly high and a small chunk of ice will suffice to keep the products in good condition for several hours. The highly effective thermal insulation built into the device, as will presently appear, is also advantageous in cold weather in that milk will not be apt to freeze when stored therein for the usual length of time.

The box 5 has the shell 7 thereof made of sheet metal, preferably galvanized iron, so as to resist corrosion, the same being also suitably painted or enameled for protection as well as good appearance. The upper edges of the shell are folded to double thickness and bent inwardly substantially at right angles, as appears at 8, thus presenting a shoulder at all four sides for abutment by wooden strips 9 which are suitably fastened together to form a top thermal insulating frame for the box. The strips 9 are rabbeted along their outer edges, as at 10, deeply enough to receive the bent-in rim portion of the shell and so that a seat is provided at 11 for the lid 6 in a plane substantially above the rim portion of the shell for a purpose presently to appear. The strips 9 at the front and back of the box rest on horizontal flanges 12 provided on sheet metal strips 13 and are thereby held against downward or inward movement away from the shoulders 8. The latter are formed to provide recesses 14 to receive the upper edges of the front and back walls of an inner container 15, also made of sheet metal, preferably galvanized iron. The mounting of the flanged strips 13 on top of the front and back walls of the container serves to reenforce these walls quite materially and keep the same from buckling. The container 15 has its front, back and bottom walls made in one piece, provided with inturned flanges 16 on its lateral edges. The sides 17, as appears in Fig. 3, have their upper ends formed like the strips 13 with recesses 14, to receive the upper ends of the flanges 16, and flanged, as at 12', to support the two side strips 9 so that they too are held firmly in place engaging the shoulders 8. The flanging of the upper ends of the sides 17 likewise serves as a reenforcement so that the container is very strong despite its simple sheet metal construction. The fastening of the flanges 16 to the sides 17 by soldering serves to make the container water-tight. It is believed to be evident how simple and economical it is to assemble the container. The box is insulated on all sides by a filling 18 of baked granulated cork, or the like, packed between the shell 7 and the inner container 15. A wooden board 19 fitting snugly within the shell 7 beneath the bottom of the container 15 thermally insulates the latter from the bottom 20 of the shell. The latter fits snugly within the shell and has marginal flanges 21 welded or otherwise suitably secured to the lower edges of the shell, as shown. The box by virtue of the construction just described is fairly light but extremely rigid, sturdy and serviceable. The cost is also kept to a minimum largely because of the facility with which the box may be assembled, it being seen that, in assembling, the shell is inverted, and the frame formed of the strips 9 is inserted; then the inner container 15 is inserted so that the flanges 12 and 12' come into abutment with the frame; the space between the side walls of the container and the shell is filled with the granulated cork, as at 18; the insulator 19 is inserted, and, finally, after tamping the aforesaid parts solidly into position, the bottom 20 is put in place and suitably welded to complete the assembly.

The lid 6 is also preferably of sheet metal, such as galvanized iron, to resist corrosion, the same being suitably painted or enameled to match the box. The marginal edges of the lid on the front and sides are folded to double thickness and bent down, as appears at 22, thus presenting a neat trim appearance. The rear edge, however, is bent to tubular form, as appears at 23, to embrace a hinge pintle 24 for hingedly mounting the lid on the box. The pintle 24 I prefer to form from a single piece of round wire of suitable size having the ends thereof bent downwardly at right angles, as appears at 25, both for the purpose of fastening the same to brackets 26 on the box 5 and providing projecting ends to hook into eyes 27 anchored in the wall represented at 28 whereon the refrigerator is arranged to be mounted. The brackets 26 provided at opposite ends of the box 5 are suitably formed of straps of sheet metal bent, as shown at 29, to embrace the ends 25 of the pintle 24 and suitably welded thereto, as represented at 30, the ends of the strap being also welded together, as at 31, and to the side walls of the box 5, as shown at 32, spot welding being preferred in each case. The central portion of the lid 6 has a wood insulator 33 fastened thereon by means of a dished sheet metal retainer 34, the marginal flanges 35 of which are suitably spot welded to the under side of the lid and are arranged to rest on the wooden seat 11, previously referred to.

It will be evident from the foregoing description that the inner container 15 is thoroughly insulated from the shell 7 as well as from the lid 6 and that the lid 6 is, furthermore, thoroughly insulated from the shell 7, wood or cork insulation intervening in both cases and minimizing conduction of heat in any one part to the other or others. The refrigerating efficiency is, therefore, fairly high, at least sufficient for the purposes contemplated. It is also believed to be evident that the refrigerator may be easily and quickly unhooked from the eyes 27 and emptied and cleaned out and as easily replaced. By virtue of the construction the weight of the unit is kept to a minimum and the handling of the same is accordingly facilitated.

I claim:

1. In a refrigerator generally of the character described, a box comprising an open-top sheet metal shell, the upper edges of said shell being bent inwardly to define shoulders, a top frame of wood or the equivalent heat insulating material fitting in said shell below and in abutment with the aforesaid shoulders, an open-top sheet metal container having the upper open end thereof fitting inside said frame and provided with outwardly projecting flanges bearing against the under side of said frame to support the latter and be held thereby in spaced relation to the shell, there being heat insulating material about the sides of said container within the shell and beneath said container, a bottom for said shell serving to retain the insulating material and to hold the aforesaid elements in their stated relation, and a lid for said box serving as a closure for the open top thereof.

2. In a refrigerator generally of the character described, a box comprising an open top sheet metal shell, the open top being defined by an inwardly directed rim portion providing shoulders extending lengthwise of all sides of the container, a top frame of wood or the equivalent heat insulating material entered into the shell through the open bottom thereof and disposed in abutment with said shoulders, an inner container having an open top defined by a rim providing outwardly directed flanges offset downwardly from the top, said container being entered into the shell through the open bottom thereof and into said frame so that the flanges come into abutment with the under side of said frame for supporting the latter, there being heat insulating material in the space in said shell about the sides of said container as well as beneath the latter, a bottom serving to retain the above described parts in the relationship described, and a lid closing the opening in said box.

3. In a refrigerator of the character described, comprising an open top sheet metal shell, and a top frame of wood or equivalent heat insulating material fitting in the open top of said shell, an inner container having an open top, the inner container being arranged to be supported in spaced insulated relation to the shell, and sheet metal strips bent to fit snugly over the top of the side walls of said container and having outwardly projecting flanges formed thereon on the lower edges thereof, the flanges serving to stiffen the strips and they in turn serving to reinforce the side walls of the container against buckling, said top frame fitting snugly about the outside of the open top of said container to hold the same to form and resting on the outwardly projecting flanges.

4. In a refrigerator of the character described, comprising an open top sheet metal shell, and a top frame of wood or equivalent heat insulating material fitting in the open top of said shell, an inner container arranged to be supported in spaced insulated relation to said shell, said container having the bottom and two opposing side walls formed in one piece of sheet metal and the other two opposing side walls being formed by two other pieces of sheet metal, the three pieces being suitably joined together to form a watertight container, the upper ends of the last two mentioned pieces being bent double and then bent outwardly to provide flanges in a plane slightly below the open top of said container, said flanges serving to stiffen the side walls of said container to prevent buckling, strips bent to fit snugly over the top of the other two side walls of said container and bent outwardly to provide flanges, the said flanges serving to stiffen the strips and they in turn serving to reinforce the said walls of the container to prevent buckling, the last mentioned flanges being disposed in the same plane with the other flanges, said top frame fitting snugly about the outside of the open top of said container to hold the same to form and resting on said flanges.

5. In a refrigerator of the character described, comprising an open top shell, an inner sheet metal container arranged to be supported in spaced insulated relation to said shell, said container having the front, bottom and back walls formed in one piece and provided with inturned flanges on the lateral edges thereof, the latter serving to strengthen and stiffen the container, the upper ends of the front and back walls having outwardly directed flanges projecting therefrom serving to reenforce and stiffen said walls as well as facilitate the mounting of said container, and side walls fitting between the front and back walls in abutment with the inner side of the inturned flanges on the front, bottom and back walls, the upper ends of said side walls being bent to overly the upper ends of the inturned flanges on the front and back walls to facilitate assembling as well as strengthen the construction, and said upper ends having outwardly directed flanges in the same plane as the outwardly directed flanges on the front and back walls whereby to reenforce and stiffen the construction as well as facilitate mounting of the container, the said side walls being fastened to the inturned flanges to complete the construction, said outwardly directed flanges being adapted to support a top frame fitting snugly about the outside of the open top of said container in the open top of the shell.

6. In a refrigerator of the character described comprising an open top shell, an inner sheet metal container arranged to be supported in spaced insulated relation to said shell, said container having front, bottom and back walls formed in one piece and provided with inturned flanges on the lateral edges thereof, the latter serving to strengthen and stiffen the container, sheet metal strips bent to overlie the upper ends of the front and back walls and having outwardly directed flanges serving to reenforce and stiffen said walls as well as facilitate the mounting of said container, and side walls fitting between the front and back walls in abutment with the inner side of the inturned flanges on the front, bottom and back walls, the upper ends of said side walls being bent to overlie the upper ends of the inturned flanges on the front and back walls to facilitate assembling as well as strengthen the construction, and said upper ends being further formed to provide outwardly directed flanges in the same plane as the outwardly directed flanges on the strips mounted on the front and back walls whereby to reenforce and stiffen the construction as well as facilitate mounting of the container, the said side walls being fastened to the inturned flanges to complete the construction, said outwardly directed flanges being adapted to support a top frame fitting snugly about the outside of the open top of said container in the open top of the shell.

In witness of the foregoing I affix my signature.

ROSWELL R. SHIRLEY.